US011736979B2

(12) United States Patent
Lan et al.

(10) Patent No.: US 11,736,979 B2
(45) Date of Patent: Aug. 22, 2023

(54) DATA PACKET TRANSMISSION METHOD AND APPARATUS TO ADDRESS A HIGH-LATENCY CAUSED WHEN DATA IS TO BE TRANSMITTED USING AN UNLICENSED FREQUENCY BAND

(71) Applicant: HUAWEI TECHNOLOGIES CO., LTD., Shenzhen (CN)

(72) Inventors: Yuan-Hao Lan, Shanghai (CN); Fei Yin, Shenzhen (CN); Yuxin Yang, Dongguan (CN); Te-Chin Chang, Taipei (TW); Haw-Wei Shu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 314 days.

(21) Appl. No.: 16/768,595

(22) PCT Filed: Nov. 30, 2017

(86) PCT No.: PCT/CN2017/113999
§ 371 (c)(1),
(2) Date: May 29, 2020

(87) PCT Pub. No.: WO2019/104659
PCT Pub. Date: Jun. 6, 2019

(65) Prior Publication Data
US 2021/0176665 A1 Jun. 10, 2021

(51) Int. Cl.
H04W 28/086 (2023.01)
H04W 28/08 (2023.01)
(Continued)

(52) U.S. Cl.
CPC ...... H04W 28/0819 (2020.05); H04B 7/0632 (2013.01); H04L 65/80 (2013.01);
(Continued)

(58) Field of Classification Search
CPC ......... H04W 28/0819; H04W 28/0284; H04W 28/0289; H04W 28/0975; H04W 72/0453;
(Continued)

(56) References Cited

U.S. PATENT DOCUMENTS 9,420,510 B1 8/2016 Surmay et al.
2004/0248553 A1* 12/2004 Barkley ................. H04L 63/08
455/411

(Continued)

FOREIGN PATENT DOCUMENTS

CN 102843697 A 12/2012
CN 103596288 A 2/2014
(Continued)

OTHER PUBLICATIONS

3GPP TR 36.889 V13.0.0 (Jun. 2015),3rd Generation Partnership Project;Technical Specification Group Radio Access Network;Study on Licensed-Assisted Access to Unlicensed Spectrum;(Release 13),total 285 pages.

(Continued)

Primary Examiner — Ivan O Latorre
(74) Attorney, Agent, or Firm — Stein IP, LLC

(57) ABSTRACT

A data packet transmission method—that includes: obtaining, by a terminal, N application programs that are running; and if the N application programs include an application program including a low-latency service; determining whether an unlicensed frequency band is in a congestion state; and instructing a network device to schedule a data packet of the terminal to a licensed frequency band for transmission when the unlicensed frequency band is in a congestion state. When determining that the N running application programs include the application program including the low-latency service, the terminal may instruct the network device to schedule the data packet of the (Continued)

terminal to the licensed frequency band for transmission, so as to transmit a data packet of the low-latency service by using the licensed frequency band. Resources in the licensed frequency band are centrally scheduled by the network device, instead of being used through contention.

22 Claims, 5 Drawing Sheets

(51) Int. Cl.
*H04B 7/06* (2006.01)
*H04L 65/80* (2022.01)
*H04W 28/02* (2009.01)
*H04W 72/0453* (2023.01)
*H04W 74/08* (2009.01)
*H04L 67/61* (2022.01)

(52) U.S. Cl.
CPC ......... *H04L 67/61* (2022.05); *H04W 28/0284* (2013.01); *H04W 28/0289* (2013.01); *H04W 28/0975* (2020.05); *H04W 72/0453* (2013.01); *H04W 74/0808* (2013.01)

(58) Field of Classification Search
CPC .......... H04W 74/0808; H04W 72/1236; H04B 7/0632; H04L 65/80; H04L 67/322; H04L 65/1059; H04N 21/2385; H04N 21/44209; H04N 21/6131; H04N 21/6371
See application file for complete search history.

(56) References Cited

U.S. PATENT DOCUMENTS

| | | |
|---|---|---|
| 2007/0054622 A1 | 3/2007 | Berkman |
| 2014/0269300 A1* | 9/2014 | Bennis ................ H04W 28/085 370/235 |
| 2015/0049763 A1* | 2/2015 | Michels .................. H04L 12/64 370/392 |
| 2016/0021661 A1 | 1/2016 | Yerramalli et al. |
| 2016/0057693 A1* | 2/2016 | Nagata .................. H04W 8/005 370/254 |
| 2016/0262073 A1* | 9/2016 | Muley ..................... H04L 43/16 |
| 2016/0381600 A1* | 12/2016 | Aksu ..................... H04W 16/14 455/453 |
| 2017/0041950 A1 | 2/2017 | Wang et al. |
| 2017/0048739 A1* | 2/2017 | Jeong .................... H04W 88/06 |
| 2017/0156075 A1 | 6/2017 | Harada et al. |
| 2017/0311170 A1* | 10/2017 | Jang ...................... H04W 16/14 |
| 2017/0353849 A1* | 12/2017 | Lim ....................... H04W 60/04 |
| 2018/0109987 A1* | 4/2018 | Xu ........................ H04W 36/20 |
| 2018/0124643 A1* | 5/2018 | Gupta ................... H04W 48/16 |
| 2019/0058999 A1* | 2/2019 | Gunasekara ........ H04W 36/165 |
| 2019/0349022 A1* | 11/2019 | Han ...................... H04W 16/14 |

FOREIGN PATENT DOCUMENTS

| | | |
|---|---|---|
| CN | 104717686 A | 6/2015 |
| CN | 105049136 A | 11/2015 |
| CN | 106162911 A | 11/2016 |
| CN | 106233813 A | 12/2016 |
| EP | 3285518 A1 | 2/2018 |

OTHER PUBLICATIONS

3GPP TS 36.213 V14.4.0 (Sep. 2017),3rd Generation Partnership Project;Technical Specification Group Radio Access Network;Evolved Universal Terrestrial Radio Access (E-UTRA);Physical layer procedures(Release 14),total 461 pages.

3GPP TS 36.300 V14.4.0 (Sep. 2017),3rd Generation Partnership Project;Technical Specification Group Radio Access Network;Evolved Universal Terrestrial Radio Access (E-UTRA) and Evolved Universal Terrestrial Radio Access Network (E-UTRAN);Overall description;Stage 2(Release 14),total 329 pages.

\* cited by examiner

DATA PACKET TRANSMISSION METHOD AND APPARATUS TO ADDRESS A HIGH-LATENCY CAUSED WHEN DATA IS TO BE TRANSMITTED USING AN UNLICENSED FREQUENCY BAND

CROSS-REFERENCE TO RELATED APPLICATIONS

This application is a national stage of International Application No. PCT/CN2017/113999, filed on Nov. 30, 2017, which is hereby incorporated by reference in its entirety.

TECHNICAL FIELD

Aspects of this application relate to the field of wireless communications technologies, and in particular, to a data packet transmission method and an apparatus.

BACKGROUND

In a long term evolution (LTE) system, a licensed assisted access (LAA) technology may be used to transmit data by using an unlicensed frequency band, to increase a service throughput in the LTE system. Currently, unlicensed frequency bands mainly include unlicensed frequency bands of 2.4 GHz to 2.4835 GHz, unlicensed frequency bands of 5.725 GHz to 5.850 GHz, and other unlicensed frequency bands.

However, in the LTE system, before using the LAA technology to transmit data on a channel in the unlicensed frequency band, a terminal first needs to listen to whether there is another device using the channel in the unlicensed frequency band to transmit data. If another device uses the channel, the terminal needs to wait for a period of time before listening, and can use the channel in the unlicensed frequency band to transmit data until the terminal determines that no other devices use the channel in the unlicensed frequency band to transmit data. Consequently, a transmission latency of a data packet is increased while a high throughput rate is obtained when the terminal transmits data on the channel in the unlicensed frequency band. For a low-latency and low-throughput service (for example, a video call service, a network live broadcast service, or a real-time battle game service), a latency problem caused when data is transmitted on the channel in the unlicensed frequency band by using the LAA technology is unacceptable.

In conclusion, when a latency requirement cannot be effectively met by using the LAA technology, how to avoid a high latency caused when data is transmitted on a channel in an unlicensed frequency band is a problem urgently to be resolved.

SUMMARY

An objective of implementations of this application is to provide a data packet transmission method and an apparatus, to resolve a high-latency problem caused when data is transmitted by using an unlicensed frequency band.

An embodiment of this application provides a data packet transmission method, including:

obtaining, by a terminal, N application programs that are running on the terminal, where N is an integer greater than 0; and if the N application programs include an application program including a low-latency service, instructing a network device to schedule a data packet of the terminal to a licensed frequency band for transmission.

According to the foregoing method, when determining that the N running application programs include the application program including a low-latency service, the terminal may instruct the network device to schedule the data packet of the terminal to the licensed frequency band for transmission, so as to transmit a data packet of the low-latency service by using the licensed frequency band. Resources in the licensed frequency band are centrally scheduled by the network device, instead of being used through contention. Therefore, a latency requirement for the low-latency service can be met by transmitting the data packet of the low-latency service by using the licensed frequency band. In this way, a high-latency problem caused when data is transmitted by using an unlicensed frequency band is resolved.

In an optional implementation, the determining, by the terminal, that the N application programs include an application program including a low-latency service includes:

collecting, by the terminal in a preset period, statistics about a quantity of uplink data packets of each of the N application programs, and if a quantity of uplink data packets of at least one of the N application programs is greater than a first threshold, determining that the application program including a low-latency service is running on the terminal;

collecting, by the terminal in a preset period, statistics about a quantity of downlink data packets of each of the N application programs, and if a quantity of downlink data packets of at least one of the N application programs is greater than a second threshold, determining that the application program including a low-latency service is running on the terminal;

collecting, by the terminal in a preset period, statistics about a quantity of sockets used by each of the N application programs, and if a quantity of sockets used by at least one of the N application programs is greater than a third threshold, determining that the application program including a low-latency service is running on the terminal; or collecting, by the terminal in a preset period, statistics about a data transmission rate of a data packet of each of the N application programs, and if a data transmission rate of a data packet of at least one of the N application programs is greater than a fourth threshold, determining that the application program including a low-latency service is running on the terminal.

In the foregoing method, a quantity of data packets received or sent by the application program including a low-latency service is relatively large, or a quantity of sockets used by the application program including a low-latency service is relatively large, or a data transmission rate of the application program including a low-latency service is relatively high. Therefore, the terminal collects, in the preset period, statistics about the quantity of uplink data packets, the quantity of downlink data packets, the quantity of used sockets, or the data transmission rate of the data packet, of each application program, so that it can be accurately determined whether the application program including a low-latency service is running on the terminal.

In an optional implementation, the determining, by the terminal, that the N application programs include an application program including a low-latency service includes:

if the terminal determines that the N application programs include an application program that is the same as an application program in an application program list, determining that the application program including a low-latency service is running on the terminal, where each application program in the application program list is an application program corresponding to a low-latency service.

In the foregoing method, when determining that the application program in the pre-established application program list is running, the terminal can determine that the application program including a low-latency service is running on the terminal. The application program including a low-latency service can be quickly and efficiently identified by using the application program list, without increasing running load of the terminal.

In an optional implementation, the instructing, by the terminal, a network device to schedule a data packet of the terminal to a licensed frequency band for transmission includes:

instructing, by the terminal by sending capability information of the terminal to the network device, the network device to schedule the data packet of the terminal to the licensed frequency band for transmission, where the capability information indicates that the terminal does not have a capability of supporting LAA;

when a channel quality indicator CQI in the unlicensed frequency band is less than or equal to a preset CQI, instructing, by the terminal by sending the CQI in the unlicensed frequency band to the network device, the network device to schedule the data packet of the terminal to the licensed frequency band for transmission; or instructing, by the terminal by sending an A2 event measurement report corresponding to the unlicensed frequency band to the network device, the network device to schedule the data packet of the terminal to the licensed frequency band for transmission, where the A2 event measurement report is used to indicate that signal quality of the unlicensed frequency band that has been configured for the terminal is less than a first quality threshold.

In the foregoing method, the terminal instructs, by indicating that the terminal does not have the capability of supporting the LAA, by sending the CQI in the unlicensed frequency band to the network device, or by sending the A2 event measurement report to the network device, the network device to schedule the data packet of the terminal to the licensed frequency band for transmission, without changing a procedure in an existing standard. This implements compatibility with the existing standard.

In an optional implementation, before the instructing, by the terminal, a network device to schedule a data packet of the terminal to a licensed frequency band for transmission, the method further includes:

determining, by the terminal based on a quantity of discovery reference signals DRSs received in the unlicensed frequency band in a preset time period, that the unlicensed frequency band is in a congestion state;

determining, by the terminal based on a detected quantity of LAA cells using the unlicensed frequency band, a detected quantity of long term evolution-unlicensed LTE-U cells using the unlicensed frequency band, and a detected quantity of wireless fidelity Wi-Fi access points using the unlicensed frequency band, that the unlicensed frequency band is in a congestion state; or determining, by the terminal based on a transmission latency of a packet internet groper ping data packet sent in the unlicensed frequency band, that the unlicensed frequency band is in a congestion state.

In the foregoing method, when determining that the low-latency service is running and when determining that the unlicensed frequency band is in the congestion state, the terminal instructs the network device to schedule the data packet of the terminal to the licensed frequency band for transmission. In this way, a data packet of the low-latency service is transmitted by using the licensed frequency band, a latency requirement for the low-latency service is met, and quality of service of the low-latency service is ensured.

According to a second aspect, an embodiment of this application provides a communications apparatus, where the communications apparatus includes a memory, a transceiver, and a processor. The memory is configured to store an instruction. The processor is configured to execute the instruction stored in the memory, and control the transceiver to receive and send a signal. When the processor executes the instruction stored in the memory, the communications apparatus is configured to perform the data packet transmission method in any one of the first aspect or the possible designs of the first aspect.

According to a third aspect, an embodiment of this application provides a communications apparatus, configured to implement the method in any one of the first aspect or the possible designs of the first aspect. The communications apparatus includes corresponding functional modules, for example, a processing unit and a transceiver unit, respectively configured to implement the steps in the foregoing method.

According to a fourth aspect, an embodiment of this application provides a computer-readable storage medium, where the computer storage medium stores a computer-readable instruction, and when a computer reads and executes the computer-readable instruction, the computer is enabled to perform the data packet transmission method in any one of the first aspect or possible designs of the first aspect.

According to a fifth aspect, an embodiment of this application provides a computer program product, and when a computer reads and executes the computer program product, the computer is enabled to perform the data packet transmission method in any one of the first aspect or the possible designs of the first aspect.

According to a sixth aspect, an embodiment of this application provides a chip, where the chip is connected to a memory, and is configured to read and execute a software program stored in the memory, to implement the data packet transmission method in any one of the first aspect or the possible designs of the first aspect.

According to a seventh aspect, an embodiment of this application provides a data packet transmission method, including:

obtaining, by a network device, a quality of service class identifier QCI of a low-latency service corresponding to an application program that is running on a terminal; and if average duration of K consecutive LBTs in an unlicensed frequency band is greater than a latency corresponding to the QCI of the low-latency service, scheduling, by the network device, a data packet of the low-latency service to a licensed frequency band for transmission, where K is an integer greater than 0.

In the foregoing method, when determining that the average duration of the K consecutive LBTs is greater than the latency corresponding to the QCI of the low-latency service, the network device may determine that the unlicensed frequency band is in a congestion state, and schedule the data packet of the low-latency service to the licensed frequency band for transmission. Resources in the licensed frequency band are centrally scheduled by the network device. Therefore, a latency requirement for the low-latency service can be met by transmitting the data packet of the low-latency service by using the licensed frequency band. In this way, a high-latency problem caused when data is transmitted by using the unlicensed frequency band is resolved.

In an optional implementation, the scheduling, by the network device, a data packet of the low-latency service to a licensed frequency band for transmission includes:

if the network device determines that a quantity of idle resource blocks RBs in the licensed frequency band is greater than or equal to a quantity of RBs required by the data packet of the low-latency service, scheduling, by the network device, the quantity of RBs required by the data packet of the low-latency service to transmit the data packet of the low-latency service; and if the network device determines that a quantity of idle RBs in the licensed frequency band is less than a quantity of RBs required by the data packet of the low-latency service, scheduling, by the network device, a data packet that is of a non-low-latency service and that is currently transmitted in the licensed frequency band to the unlicensed frequency band for transmission, and scheduling RBs that are in the licensed frequency band and that are used to transmit the data packet of the non-low-latency service to transmit the data packet of the low-latency service.

In an optional implementation, a value of the QCI is any one of the following: 1, 2, 3, 5, 7, 65, 66, 69, and 70.

According to an eighth aspect, an embodiment of this application provides a communications apparatus, where the communications apparatus includes a memory, a communications interface, and a processor. The memory is configured to store an instruction. The processor is configured to execute the instruction stored in the memory, and control the communications interface to receive and send a signal. When the processor executes the instruction stored in the memory, the communications apparatus is configured to perform the data packet transmission method in any one of the seventh aspect or the possible designs of the seventh aspect.

According to a ninth aspect, an embodiment of this application provides a communications apparatus, configured to implement the method in any one of the seventh aspect or the possible designs of the seventh aspect. The communications apparatus includes corresponding functional modules, for example, a processing unit and a transceiver unit, respectively configured to implement the steps in the foregoing method.

According to a tenth aspect, an embodiment of this application provides a computer-readable storage medium, where the computer storage medium stores a computer-readable instruction, and when the computer-readable instruction is read and executed by a computer, the computer is enabled to perform the data packet transmission method in any one of the seventh aspect or the possible designs of the seventh aspect.

According to an eleventh aspect, an embodiment of this application provides a computer program product, and when the computer program product is read and executed by a computer, the computer is enabled to perform the data packet transmission method in any one of the seventh aspect or the possible designs of the seventh aspect.

According to a twelfth aspect, an embodiment of this application provides a chip, where the chip is connected to a memory, and is configured to read and execute a software program stored in the memory, to implement the data packet transmission method in any one of the seventh aspect or the possible designs of the seventh aspect.

DESCRIPTION OF EMBODIMENTS

The following further describes in detail the embodiments of this application with reference to the accompanying drawings.

In embodiments of this application, a terminal, also referred to as user equipment (User Equipment, UE), is a device that provides voice and/or data connectivity to a user, for example, a handheld device with a wireless connection function, or a vehicle-mounted device. A common terminal includes, for example, a mobile phone, a tablet computer, a notebook computer, a palmtop computer, a mobile internet device (MID), or a wearable device such as a smartwatch, a smart band, and a pedometer.

A network device is mainly responsible for providing a wireless connection for the terminal, to ensure reliable transmission of uplink data and downlink data of the terminal. The network device may be a gNB (generation Node B) in a fifth generation (5G) system, a base transceiver station (BTS) in a global system for mobile communications (GSM) or a code division multiple access (CDMA), or a NodeB (NB) in a wideband code division multiple access (WCDMA) system, or may be an evolved NodeB (Evolutional Node B, eNB, or eNodeB) in a long term evolution (LTE) system.

Figure 1:
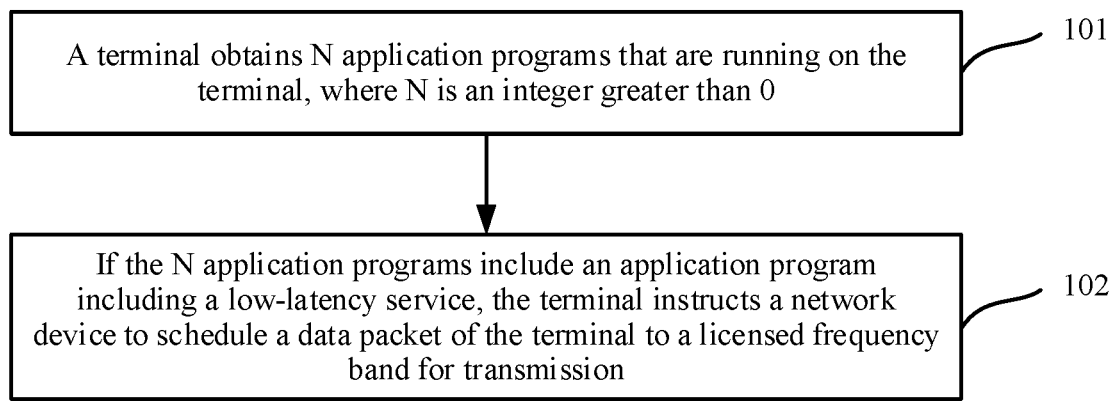
FIG. 1 is a schematic flowchart of a data packet transmission method according to an embodiment of this application.

FIG. 1 is a schematic flowchart of a data packet transmission method according to an embodiment of this application. Referring to FIG. 1, the method includes the following steps.

Step 101: A terminal obtains N application programs that are running on the terminal, where N is an integer greater than 0.

Step 102: If the N application programs include an application program including a low-latency service, the terminal instructs a network device to schedule a data packet of the terminal to a licensed frequency band for transmission.

In step 101, each application program that is running on the terminal corresponds to one or more processes, the process is an instance of a running application program, and the terminal can determine the running application program based on a currently running process.

In this embodiment of this application, a value of N may be determined depending on an actual case. For example, the value of N may be a total quantity of all application programs that are currently running on the terminal, or the value of N may be a preset value. For example, the preset value of N is 10. This is not limited in this embodiment of this application.

In step 102, a service represents a type of data services provided for a user by a network, and the service includes but is not limited to a voice service, a video service, and the like.

In this embodiment of this application, different services correspond to different quality of service class identifiers (QCI), and different QCIs correspond to different latencies. A device such as the network device or the terminal can determine, based on a QCI of a service, a minimum latency required by the service, to implement corresponding resource scheduling for a data packet corresponding to the service. For example, Table 1 shows QCIs and latencies corresponding to different services in an LTE system.

TABLE 1

| QCI | Delay | Service |
|---|---|---|
| 1 | 100 ms | Voice call (non-live streaming) service |
| 2 | 150 ms | Voice call (live streaming) service |
| 3 | 50 ms | Real-time game service |
| 4 | 300 ms | Non-call video service |

For example, in Table 1, a QCI corresponding to a voice call (non-live streaming) service is 1, and a corresponding latency is 100 m; and a QCI corresponding to a real-time game service is 3, and a corresponding latency is 50 ms.

With reference to the foregoing description, in this embodiment of this application, the low-latency service may be a service whose latency required by the service is less than a preset latency. For example, with reference to Table 1, the preset latency is 120 ms. In this case, the low-latency service may be the voice call service, the real-time game service, or the like. Certainly, the preset latency may be alternatively another value, and details are not described herein.

Because there is a correspondence between a QCI and a latency, in this embodiment of this application, the low-latency service may be a service whose QCI is a preset value, for example, a service corresponding to any one of the following QCI values: 1, 2, 3, 5, 7, 65, 66, 69, and 70. Certainly, the foregoing is merely an example, and the low-latency service may alternatively correspond to another QCI. This is not limited in this application.

It should be noted that, there is the correspondence between the QCI and the latency because different QCIs correspond to different scheduling priorities. When resources are scheduled, a network side preferentially schedules a resource for a service with a high scheduling priority. Therefore, services with different QCIs have different latencies.

For example, Table 2 shows a correspondence between a scheduling priority and a QCI.

TABLE 2

| Scheduling priority | QCI |
|---|---|
| 1 | 1, 3, 5, 65, 66, 69, or 70 |
| 2 | 2 or 7 |
| 3 | 4, 6, 7, or 9 |
| 4 | 10 or 12 |

In Table 2, scheduling priorities are sequentially 1, 2, 3, and 4 in descending order. When the network side needs to schedule resources for both a service with a QCI being 2 and a service with a QCI being 5, the network side preferentially schedules a resource for the service with the QCI being 2 based on a scheduling level. Other cases are not described again.

In this embodiment of this application, on a terminal side, a data packet corresponding to a service is processed by an application program on a terminal. For example, a voice-type application program can process a data packet of a voice service, and the terminal can determine a service corresponding to each application program. For example, an application program that is running on the terminal is a "game hall", and the terminal can determine that the "game hall" corresponds to a real-time game service, and further determine that the service corresponding to the application program is a low-latency service.

With reference to the foregoing description, for the purpose of determining whether the N application programs that are running on the terminal include the application program including a low-latency service, in a possible implementation, an application program list may be preset, and each application program in the application program list is an application program corresponding to a low-latency service. When determining that the N running application programs include an application program that is the same as an application program in the application program list, the terminal can determine that the application program including a low-latency service is running on the terminal.

For example, the application programs included in the application program list may be as follows: a video live program A, a voice call program B, and an online game C. When determining that the N running application programs include the video live program A, the terminal may determine that the application program including a low-latency service is running on the terminal.

Further, when determining that the N running application programs include the application program that is the same as the application program in the application program list, the terminal may further determine, in a preset period, whether a quantity of uplink data packets of the application program that is the same as the application program in the application program list is greater than a first threshold. If the quantity of uplink data packets is greater than the first threshold, it can be determined that the application program including a low-latency service is running on the terminal. Alternatively, when determining that the N running application programs include the application program that is the same as the application program in the application program list, the terminal may further determine, in a preset period, whether a quantity of downlink data packets of the application program that is the same as the application program in the application program list is greater than a second threshold. If the quantity of downlink data packets is greater than the second threshold, it can be determined that the application program including a low-latency service is running on the terminal.

In another possible implementation, the terminal may determine, based on a data packet processed by an application program, whether the N running application programs include the application program including a low-latency service. Specifically, the following several cases may be included.

Case 1: The terminal may collect, in a preset period, statistics about a quantity of uplink data packets of each of the N application programs, and if a quantity of uplink data packets of at least one of the N application programs is greater than a first threshold, determine that the application program including a low-latency service is running on the terminal.

It should be noted that, how the terminal specifically collects statistics about the quantity of uplink data packets of each application program is not limited in this embodiment of this application. For example, the terminal sets a corresponding counter for each application program, and when sending one uplink data packet corresponding to the application program, a count value of a counter corresponding to the application program is increased by one. Certainly, the foregoing is merely an example. The terminal may alternatively collect statistics about the quantity of uplink data packets of each application program in another manner. For details, refer to an implementation in the prior art. Details are not described herein.

Case 2: The terminal may collect, in a preset period, statistics about a quantity of downlink data packets of each of the N application programs, and if a quantity of downlink data packets of at least one of the N application programs is greater than a second threshold, determine that the application program including a low-latency service is running on the terminal.

It should be noted that, how the terminal specifically collects statistics about the quantity of downlink data packets of each application program is not limited in this embodiment of this application. For example, refer to the description of collecting statistics about the uplink data packets in Case 1. Details are not described herein.

It should be noted that in this embodiment of this application, the uplink data packet or the downlink data packet may be a user datagram protocol (UDP) packet, a transmission control protocol (TCP) packet, or the like. This is not limited in this embodiment of this application.

Case 3: The terminal may collect, in a preset period, statistics about a quantity of sockets (socket) used by each of the N application programs, and if a quantity of sockets of at least one of the N application programs is greater than a third threshold, determine that the application program including a low-latency service is running on the terminal.

It should be noted that, how the terminal specifically collects statistics about the quantity of sockets used by each application program is not limited in this embodiment of this application. For example, the terminal may invoke an application programming interface in an operating system used by the terminal to collect statistics about the quantity of sockets used by each application program. Certainly, the foregoing is merely an example. The terminal may alternatively collect statistics about the quantity of sockets used by each application program in another manner. Details are not described herein.

Case 4: The terminal may collect, in a preset period, statistics about a data transmission rate of a data packet of each of the N application programs, and if a data transmission rate of a data packet of at least one of the N application programs is greater than a fourth threshold, determine that the application program including a low-latency service is running on the terminal.

It should be noted that, for the first threshold to the fourth threshold, a specific value of each threshold may be determined depending on an actual case, and details are not described herein.

Further, after determining that the application program including a low-latency service is running, the terminal may first determine whether an unlicensed frequency band configured by the network device for the terminal is in a congestion state, and if determining that the unlicensed frequency band is in the congestion state, optimize a network, so as to ensure that a latency of transmitting a data packet of the low-latency service can meet a requirement for the low-latency service. How to optimize the network is described in detail in the following.

The terminal may determine, in a plurality of manners, whether the unlicensed frequency band is in the congestion state. Details are described in the following.

In a first possible implementation, the terminal may determine, in a preset time period, whether a quantity of discovery reference signals (DRSs) received in the unlicensed frequency band is less than a fifth threshold. If the terminal determines that the quantity of DRSs received in the unlicensed frequency band is less than the fifth threshold, the terminal may determine that the unlicensed frequency band is in the congestion state. Otherwise the terminal may determine that the unlicensed frequency band is in an idle state.

In the foregoing implementation, in the prior art, the network device needs to send a DRS, so that the terminal determines signal quality of the unlicensed frequency band based on the received DRS. Before sending the DRS, the network device needs to listen to, by using a listen before talk (LBT) technology, whether the unlicensed frequency band is idle. If the unlicensed frequency band is idle, the network device may send the DRS. Otherwise, the network device needs to wait until the network determines that the unlicensed frequency band is idle. Therefore, when the quantity of DRSs sent by the network device in the preset time period is greater than or equal to the fifth threshold, it may indicate that a waiting time for sending the DRS each time is relatively short. In this way, it may be determined that there are relatively few devices contending for using the unlicensed frequency band, and the unlicensed frequency band is in the idle state. On the contrary, when the quantity of DRSs sent by the network device in the preset time period is less than the fifth threshold, it may indicate that a waiting time for sending the DRS each time is relatively long, there are a relatively large quantity of devices contending for using the unlicensed frequency band, and the unlicensed frequency band is in the congestion state.

A value of the fifth threshold may be determined depending on an actual case. For example, when the preset time period is 1 minute, the value of the fifth threshold may be 10. Certainly, the foregoing is merely an example, and the fifth threshold may be alternatively another value. Details are not described herein.

In a second possible implementation, the terminal detects a quantity of LAA cells using the unlicensed frequency band, a quantity of long term evolution-unlicensed (LTE-Unlicensed, LTE-U) cells using the unlicensed frequency band, and a quantity of wireless fidelity (Wireless Fidelity, Wi-Fi) access points using the unlicensed frequency band. If the terminal determines that a sum of the detected quantity of LAA cells, the detected quantity of LTE-U cells, and the detected quantity of Wi-Fi access points is greater than a sixth threshold, the terminal determines that the unlicensed frequency band is in the congestion state. On the contrary, if the terminal determines that a sum of the detected quantity of LAA cells, the detected quantity of LTE-U cells, and the detected quantity of Wi-Fi access points is less than or equal to a sixth threshold, the terminal determines that the unlicensed frequency band is in an idle state.

In the prior art, a Wi-Fi access point sends a broadcast signal by using the unlicensed frequency band. The broadcast signal includes information such as an identifier of the Wi-Fi access point. After receiving the broadcast signal, another device may determine, based on factors such as channel quality of a current unlicensed frequency band, whether to access the Wi-Fi access point. In this embodiment of this application, the terminal may listen to, in the unlicensed frequency band, the broadcast signal sent by the Wi-Fi access point, to determine a quantity of Wi-Fi access points that send the broadcast signal. Correspondingly, an LAA base station in the LAA cell and an LTE-U base station in the LTE-U cell also send broadcast signals by using the unlicensed frequency band. The terminal may listen to, in the unlicensed frequency band, the broadcast signals in the LAA cell and the LTE-U cell, to determine the quantity of LAA cells and the quantity of LTE-U cells.

In this embodiment of this application, a value of the sixth threshold may be determined depending on an actual case. For example, the value of the sixth threshold may be 15. Certainly, the foregoing is merely an example, and the sixth threshold may be alternatively another value. Details are not described herein.

In a third possible implementation, the terminal obtains a transmission latency of a ping data packet in the unlicensed frequency band by sending the packet internet groper (Packet Internet Groper, ping) data packet in the unlicensed frequency band. If the terminal determines that the transmission latency is greater than a seventh threshold, the terminal may determine that the unlicensed frequency band is in the congestion state. Correspondingly, if the terminal determines that the transmission latency is less than or equal to a seventh threshold, the terminal determines that the unlicensed frequency band is in an idle state.

In this embodiment of this application, a value of the seventh threshold may be determined depending on an actual case. For example, the seventh threshold may be a latency required by a real-time game service. Certainly, the seventh threshold may be alternatively another value. Examples are not described one by one herein.

It should be noted that the transmission latency of the ping data packet in the unlicensed frequency band may alternatively be sent to the terminal after being measured by another device. This is not limited in this embodiment of this application, and details are not described herein.

In this embodiment of this application, after determining that the unlicensed frequency band is in the congestion state, the terminal may optimize a network, to meet a latency requirement for the low-latency service.

In this embodiment of this application, the terminal may instruct, by using the following methods, the network device to schedule the data packet of the terminal to the licensed frequency band for transmission, so as to optimize the network.

Method 1:

The terminal instructs, by sending capability information of the terminal to the network device, the network device to schedule the data packet of the terminal to the licensed frequency band for transmission, where the capability information indicates that the terminal does not have a capability of supporting LAA.

After receiving the capability information sent by the terminal, the network device determines, based on the capability information, that the terminal does not have the capability of supporting LAA, and therefore determines that the terminal cannot transmit data in an unlicensed frequency band. In this way, the network device schedules the data packet of the terminal to the licensed frequency band for transmission.

It should be noted that, in this embodiment of this application, the capability information of the terminal may be sent to the network device by using radio resource control (RRC) signaling. The RRC signaling includes a field corresponding to the capability information. The terminal may set, to a pre-agreed value, the field corresponding to the capability information in the RRC signaling, to indicate whether the terminal has the capability of supporting LAA. For example, when a value of the field corresponding to the capability information in the RRC signaling is 1, it indicates that the terminal has the capability of supporting LAA; and when a value of the field corresponding to the capability information in the RRC signaling is 0, it indicates that the terminal does not have the capability of supporting LAA. When the value of the field corresponding to the capability information in the RRC signaling sent by the terminal to the network device is 0, after receiving the RRC signaling, the network device may determine, based on the value of the field corresponding to the capability information in the RRC signaling, that the terminal does not have the capability of supporting LAA. In this case, the network device schedules the data packet of the terminal to the licensed frequency band for transmission.

Certainly, the terminal may alternatively report another capability of the terminal by using the RRC signaling. This is not limited in this embodiment of this application, and details are not described herein.

Method 2: In this method, the network device has configured an unlicensed frequency band for the terminal.

The terminal instructs, by indicating that a channel quality indicator (Channel Quality Indicator, CQI) of the unlicensed frequency band is less than or equal to a preset CQI to the network device, the network device to schedule the data packet of the terminal to the licensed frequency band for transmission.

In the prior art, a value of the CQI ranges from 0 to 31. A smaller value of the CQI indicates poorer channel quality, and a larger value of the CQI indicates better channel quality. In this embodiment of this application, when determining that an application program including a low-latency service is running on the terminal, the terminal may measure channel quality of the unlicensed frequency band, and determine the CQI of the unlicensed frequency band based on the channel quality of the unlicensed frequency band. When determining that the CQI of the unlicensed frequency band is less than or equal to the preset CQI, the terminal sends the CQI of the unlicensed frequency band to the network device. After receiving the CQI of the unlicensed frequency band, the network device determines that the CQI of the unlicensed frequency band is less than or equal to the preset CQI, and determines that the channel quality of the unlicensed frequency band is relatively poor and the unlicensed frequency band is not suitable for data transmission. Therefore, the network device deactivates the unlicensed frequency band configured for the terminal, and schedules the data packet of the terminal to the licensed frequency band for transmission.

In this embodiment of this application, a value of the preset CQI may be determined depending on an actual case. For example, the value of the preset CQI may be any value from 0 to 5. Certainly, the preset CQI may be alternatively a fixed value. For example, the value of the preset CQI may be 0, and examples are not described one by one herein.

For example, when the preset CQI is 1, after determining that the CQI of the unlicensed frequency band is 0, the terminal may determine that the CQI of the unlicensed frequency band is less than the preset CQI, and send the CQI of the unlicensed frequency band to the network device. After receiving the CQI of the unlicensed frequency band sent by the terminal, the network device determines that the CQI of the unlicensed frequency band is less than the preset CQI, and the network device may determine that the channel quality of the unlicensed frequency band is very poor. Therefore, the network device may determine that the data packet of the terminal cannot be scheduled for transmission in the unlicensed frequency band, and schedule the data packet of the terminal to the licensed frequency band for transmission.

Method 3:

In the prior art, after configuring an unlicensed frequency band for the terminal, if the network device receives an A2 event measurement report sent by the terminal, the network device deactivates the unlicensed frequency band, to schedule the data packet of the terminal only in the licensed frequency band.

Therefore, in this embodiment of this application, when determining that an application program including a low-latency service is running, the terminal may instruct, by sending the A2 event measurement report in the unlicensed frequency band to the network device, the network device to deactivate the unlicensed frequency band, so as to instruct the network device to schedule the data packet of the terminal to the licensed frequency band for transmission.

The A2 event measurement report is used to indicate that signal quality of the unlicensed frequency band configured for the terminal is less than a first quality threshold. The first quality threshold may be a value specified in an existing standard. Details are not described in this embodiment of this application.

In this embodiment of this application, the A2 event measurement report may be sent when the terminal determines that a first preset condition is met, and the first preset condition includes one or more of the following:

the application program corresponding to the low-latency service is running on the terminal; and the signal quality of the unlicensed frequency band is less than the first quality threshold.

Alternatively, the first preset condition includes one or more of the following:

the application program including a low-latency service is running on the terminal, and the unlicensed frequency band is in a congestion state; and the signal quality of the unlicensed frequency band is less than the first quality threshold.

When determining that the first preset condition is met, the terminal sends the A2 event measurement report to the network device. After receiving the A2 event measurement report, the network device determines that the signal quality of the unlicensed frequency band is less than the first quality threshold, so as to determine that the channel quality of the unlicensed frequency band is relatively poor and the unlicensed frequency band is not suitable for data transmission. Therefore, the network device deactivates the unlicensed frequency band configured for the terminal, and schedules the data packet of the terminal to the licensed frequency band for transmission.

It should be noted that, in the prior art, the A2 event measurement report is an event-triggered report. To be specific, a sending condition of the A2 event measurement report is that the signal quality of the unlicensed frequency band is less than the first quality threshold. The terminal sends the event A2 measurement report only when determining that the sending condition of the event A2 measurement report is met. In this embodiment of this application, a sending condition of the A2 event measurement report is added, and an original sending condition is not deleted. This can implement compatibility with an existing technology, without affecting sending of an existing A2 event measurement report. In other words, when determining that the sending condition of the existing A2 event measurement report is met, the terminal still sends the A2 event measurement report.

Method 4:

To increase a data throughput of the terminal, when an unlicensed frequency band is not configured for the terminal, if the network device determines that signal quality of the unlicensed frequency band is greater than a second quality threshold, the network device configures the unlicensed frequency band for the terminal. In the prior art, when determining that the signal quality on the unlicensed frequency band is greater than the second quality threshold, the terminal sends an A4 event measurement report to the network device, so that the network device can determine, based on the received A4 event measurement report, that the signal quality of the unlicensed frequency band is greater than the second quality threshold.

The A4 event measurement report is used to indicate that the signal quality of the unlicensed frequency band is greater than the second quality threshold. The second quality threshold may be a value specified in an existing standard. Details are not described in this embodiment of this application.

In this embodiment of this application, to prevent the network device from configuring the unlicensed frequency band for the terminal, when determining that an application program including a low-latency service is running on the terminal, the terminal discards the generated A4 event measurement report or does not generate the A4 event measurement report, so that the network device cannot determine the signal quality of the unlicensed frequency band based on the A4 event measurement report, and schedules the data packet of the terminal to the licensed frequency band for transmission.

In the prior art, similar to the A2 event measurement report, the A4 event measurement report is also an event-triggered report. To be specific, a sending condition of the A4 event measurement report is that the signal quality of the unlicensed frequency band is greater than the second quality threshold. When determining that the foregoing condition is met, the terminal sends the A4 event measurement report.

In this embodiment of this application, the sending condition of the A4 event measurement report is further limited. To be specific, the sending condition of the A4 event measurement report is as follows:

no application program including a low-latency service runs on the terminal, and the signal quality of the unlicensed frequency band is greater than the second quality threshold.

In this embodiment of this application, when an application program including a low-latency service runs on the terminal, the terminal intercepts sending of the A4 event measurement report. In this way, the network device can be prevented from sending the A4 time measurement report when determining that the signal quality of the unlicensed frequency band is relatively good (but does not meet a latency requirement for the low-latency service), so that the network device schedules the data packet of the terminal to the unlicensed frequency band for transmission, and consequently a latency of a data packet of the low-latency service is increased.

After instructing the network device to schedule the data packet of the terminal to the licensed frequency band for transmission, the terminal receives or sends the data packet by using the licensed frequency band. In the licensed frequency band, time-frequency resources are centrally scheduled by the network device. Therefore, the network device may preferentially schedule the data packet of the low-latency service, and this reduces a latency of the data packet of the low-latency service.

In this embodiment of this application, when the terminal determines that no application program including a low-latency service runs on the terminal, the sending condition of the A4 event measurement report is the same as that in the prior art. This implements compatibility with the existing technology.

The following describes the foregoing process by using a specific embodiment.

Figure 2:
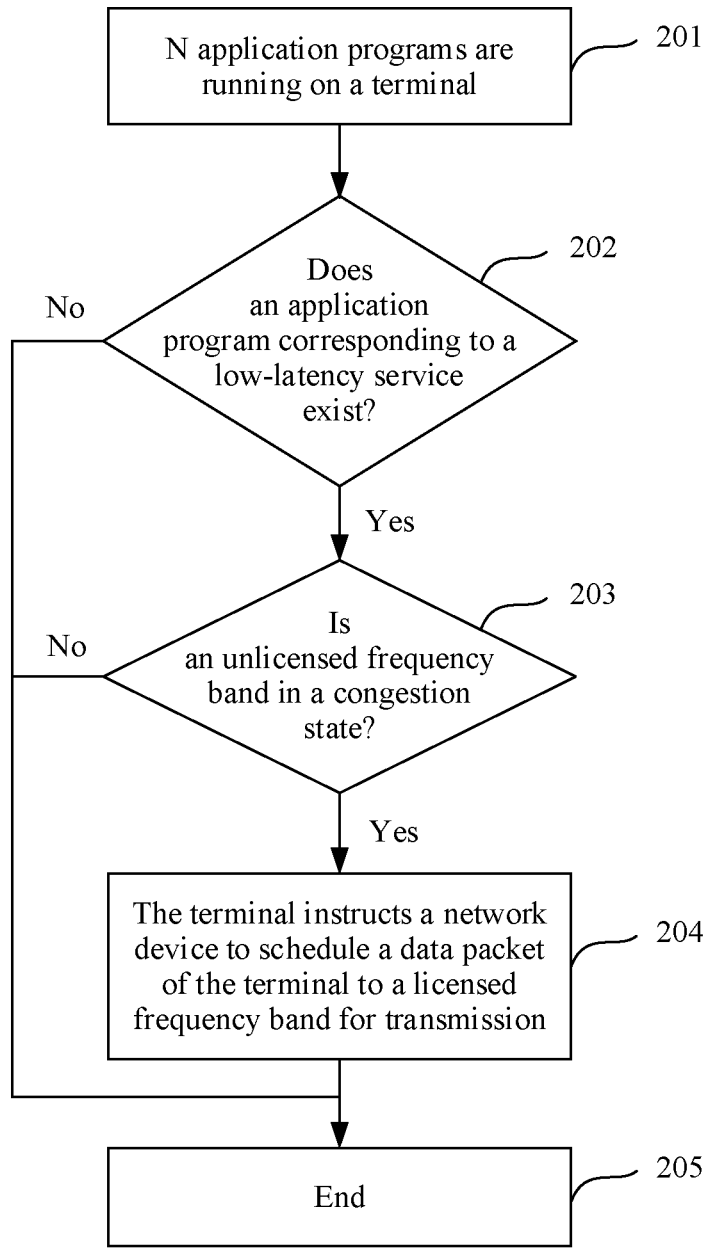
FIG. 2 is a schematic diagram of network optimization according to an embodiment of this application.

FIG. 2 is a schematic diagram of network optimization according to an embodiment of this application.

Step 201: N application programs are running on a terminal.

For example, the terminal may determine, based on a process currently executed by the terminal, an application program corresponding to each process.

Step 202: The terminal determines whether the N application programs include an application program including a low-latency service; and if yes, performs step 203, or otherwise, performs step 205.

Specifically, the terminal may determine whether there is an application program in a preset application program list that is the same as an application program in the N application programs. If yes, the terminal may determine that the application program including a low-latency service is running on the terminal. Certainly, the terminal may alternatively determine, by using another method, whether the application program including a low-latency service is running. For details, refer to the description in step 102. Details are not described herein.

Step 203: The terminal determines whether an unlicensed frequency band is in a congestion state, and if yes, performs step 204, or otherwise, performs step 205.

It should be noted that step 203 is an optional step. After determining that the application program including a low-latency service is running, the terminal may directly perform step 204 or step 205.

For specific content of this step, refer to the description in step 102. Details are not described herein.

Step 204: The terminal instructs a network device to schedule a data packet of the terminal to a licensed frequency band for transmission.

For specific content of this step, refer to the description in step 102. Details are not described herein.

Step 205: An entire process ends.

According to the foregoing process, when determining that the low-latency service is running and when determining that the unlicensed frequency band is in the congestion state, the terminal instructs the network device to schedule the data packet of the terminal to the licensed frequency band for transmission, so as to transmit the data packet of the low-latency service by using the licensed frequency band. In this way, a latency requirement for the low-latency service is met, and quality of service of the low-latency service is ensured.

In this embodiment of this application, the network device may further optimize scheduling of the data packet of the low-latency service, so that the data packet of the low-latency service has a relatively low latency. Details are described in the following.

Figure 3:
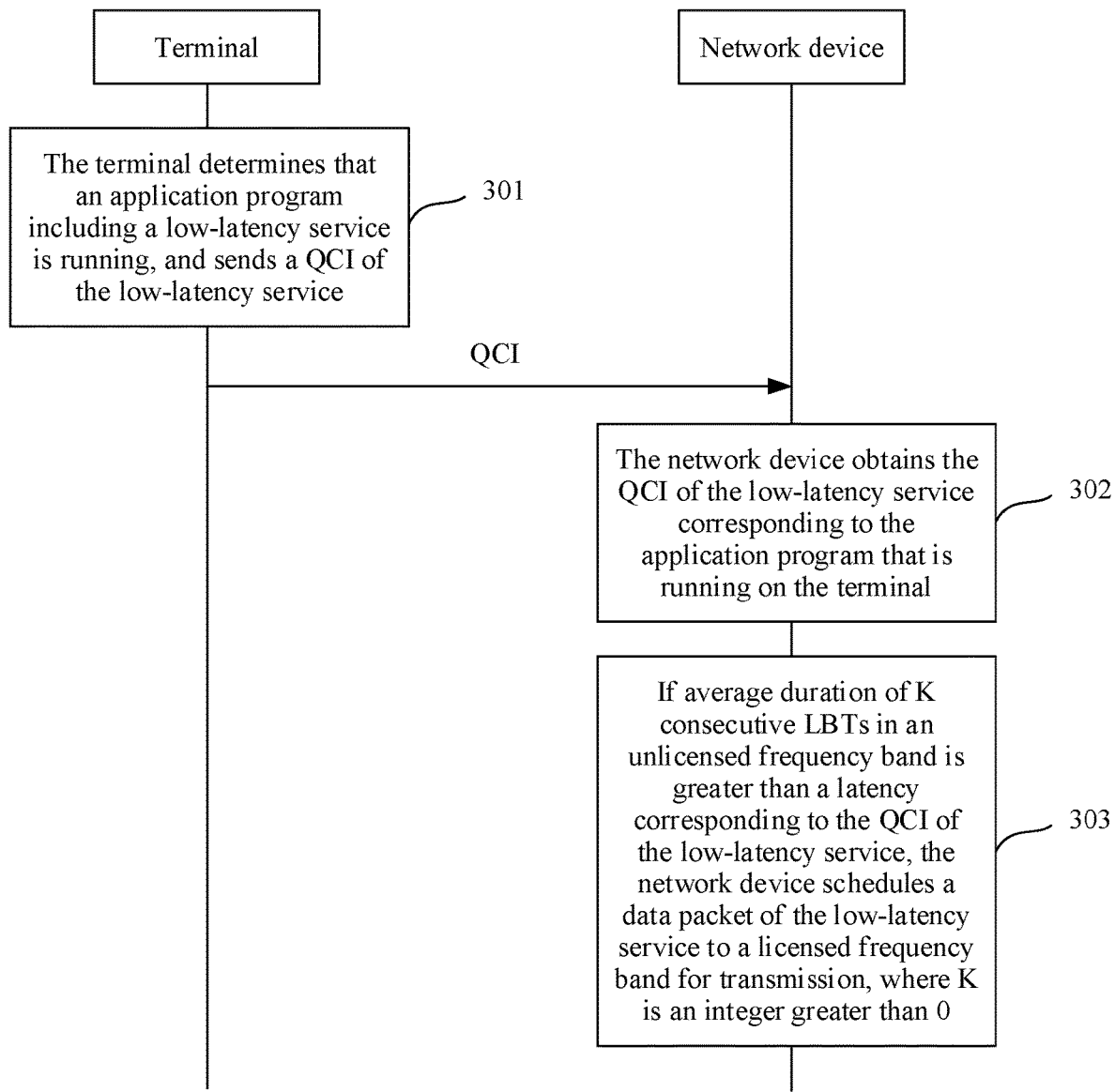
FIG. 3 is a schematic flowchart of a data packet transmission method according to an embodiment of this application.

FIG. 3 is a schematic flowchart of a data packet transmission method according to an embodiment of this application. Referring to FIG. 3, the method includes the following steps.

Step 301: A terminal determines that an application program including a low-latency service is running, and sends a QCI of the low-latency service.

In step 301, the terminal may send a request message including the QCI of the low-latency service to a core network device. The request message is used to instruct the core network device to establish a dedicated bearer for the low-latency service. The established dedicated bearer may be used to bear a data packet of the low-latency service.

The core network device may be a device such as a mobility management entity (Mobility Management Entity, MME).

For a specific meaning of the low-latency service, refer to the descriptions in step 101 and step 102. Details are not described herein. Correspondingly, for how the terminal determines the application program that is corresponding to the low-latency service and that is running on the terminal, refer to the descriptions in step 101 and step 102. Details are not described herein.

It should be noted that different services correspond to different QCIs, and different QCIs correspond to different latencies. For a correspondence between a service, a QCI, and a latency, refer to Table 1. Details are not described herein. The correspondence between a service, a QCI, and a latency may be pre-agreed in a protocol. When determining a low-latency service, the terminal may determine a QCI and a latency that correspond to the low-latency service.

It should be noted that a value of the QCI of the low-latency service may be any one of the following: 1, 2, 3, 5, 7, 65, 66, 69, and 70. Certainly, the QCI of the low-latency service may be alternatively another value, and examples are not described one by one herein.

In this embodiment of this application, the request message may be non-access stratum (Non-access stratum, NAS) signaling. To be specific, the terminal may send, by using the NAS signaling, the QCI of the low-latency service to the core network device.

The core network device receives the request message that is sent by the terminal and that includes the QCI of the low-latency service, and sends the QCI of the low-latency service to a network device.

After receiving the request message that is sent by the terminal and that includes the QCI of the low-latency service, the core network device establishes the dedicated bearer context for the low-latency service between the terminal and the core network device.

In a procedure of establishing the dedicated bearer, the core network device sends the QCI of the low-latency service to the network device, so that the network device schedules the data packet of the low-latency service based on the QCI of the low-latency service.

It should be noted that the specific procedure of establishing the dedicated bearer by the core network device is not limited in this embodiment of this application. For details, refer to descriptions in an existing standard. Details are not described herein. Similarly, for a specific function and a usage method of the dedicated bearer, refer to descriptions in the existing standard. Details are not described herein.

Step 302: The network device obtains the QCI of the low-latency service corresponding to the application program that is running on the terminal.

Step 303: If average duration of K consecutive LBTs in an unlicensed frequency band is greater than a latency corresponding to the QCI of the low-latency service, the network device schedules the data packet of the low-latency service to a licensed frequency band for transmission, where K is an integer greater than 0.

In step 304, the K consecutive LBTs may be performed before the network device receives the QCI of the low-latency service, or may be performed after the network device receives the QCI of the low-latency service. A value of K may be determined depending on an actual case. For example, K may be 10. Details are not described herein.

The latency corresponding to the QCI of the low-latency service may be determined based on a correspondence between the QCI and the latency. For details, refer to the descriptions in step 101 and step 102. Details are not described herein.

If the network device determines that the average duration is greater than the latency corresponding to the QCI of the low-latency service, the network device may determine that a latency for transmitting a data packet in the unlicensed frequency band is greater than the latency corresponding to the QCI of the low-latency service, so as to determine that the data packet of the low-latency service cannot be scheduled to the unlicensed frequency band for transmission. In this case, the network device may schedule the data packet of the low-latency service to the licensed frequency band for transmission.

Specifically, in an uplink direction, when determining that the terminal needs to send the data packet of the low-latency service, the network device schedules a corresponding quantity of RBs in the licensed frequency band for the terminal based on a quantity of resource blocks (RBs) required by the terminal to send the data packet of the low-latency service. Correspondingly, the terminal may send the data packet of the low-latency service by using the RBs scheduled by the network device in the licensed frequency band. An RB is a minimum unit of a time-frequency resource scheduled by the network device.

It should be noted that, how the network device specifically determines the quantity of resource blocks required for transmitting the data packet of the low-latency service is not limited in this embodiment of this application. For example, when needing to send an uplink data packet of the low-latency service, the terminal may first send a buffer status report (BSR) to the network device, where the buffer status report is used to indicate a data volume of uplink data that needs to be sent by the terminal; and the network device may determine, based on the data volume of the uplink data that needs to be sent by the terminal, a quantity of RBs that need to be scheduled for the terminal.

In a downlink direction, when receiving the data packet that is of the low-latency service and that is sent to the terminal, the network device schedules, in the licensed frequency band, the quantity of RBs required by the data packet of the low-latency service, and sends the data packet of the low-latency service to the terminal by using the scheduled RBs. Correspondingly, the terminal may receive the data packet of the low-latency service by using the RBs scheduled by the network device in the licensed frequency band.

It should be noted that, in this embodiment of this application, when a packet loss or another case occurs in a transmitted data packet, processing, for example, retransmission, may be performed with reference to a procedure in an existing standard. Details are not described herein.

Further, before scheduling a time-frequency resource for the data packet of the low-latency service, the network device first determines whether a quantity of idle RBs in the licensed frequency band is greater than or equal to the quantity of RBs required by the data packet of the low-latency service. If yes, the network device may schedule the quantity of RBs required by the data packet of the low-latency service to transmit the data packet of the low-latency service.

It should be noted that RBs in the licensed frequency band are centrally scheduled by the network device. Therefore, the network device may determine the quantity of idle RBs.

Correspondingly, if the network device determines that the quantity of idle RBs in the licensed frequency band is less than the quantity of RBs required by the data packet of the low-latency service, the network device schedules a data packet that is of a non-low-latency service and that is currently transmitted in the licensed frequency band to the unlicensed frequency band for transmission, and schedules RBs that are in the licensed frequency band and that are used to transmit the data packet of the non-low-latency service to transmit the data packet of the low-latency service. The non-low-latency service may be any service other than the low-latency service, or the non-low-latency service is a service whose corresponding latency is greater than a latency corresponding to the low-latency service.

Based on a same technical concept, an embodiment of this application further provides a communications apparatus. The communications apparatus may perform actions performed by the terminal in the foregoing method embodiment.

Figure 4:
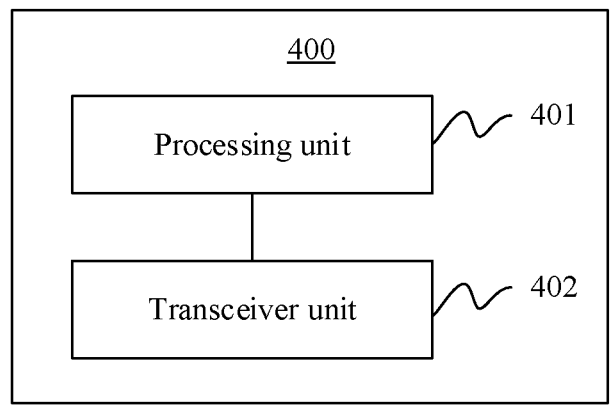
FIG. 4 is a schematic structural diagram of a communications apparatus according to an embodiment of this application.

FIG. 4 is a schematic structural diagram of a communications apparatus according to an embodiment of this application.

The communications apparatus 400 includes a processing unit 401 and a transceiver unit 402.

The processing unit 401 is configured to obtain N application programs that are running on the terminal, where N is an integer greater than 0.

The transceiver unit 402 is configured to: if the N application programs include an application program including a low-latency service, instruct a network device to schedule a data packet of the terminal to a licensed frequency band for transmission.

The communications apparatus 400 may further perform another action or method performed by the terminal in the foregoing method embodiment. For details, refer to the descriptions in step 101 and step 102. Details are not described herein.

Figure 5:
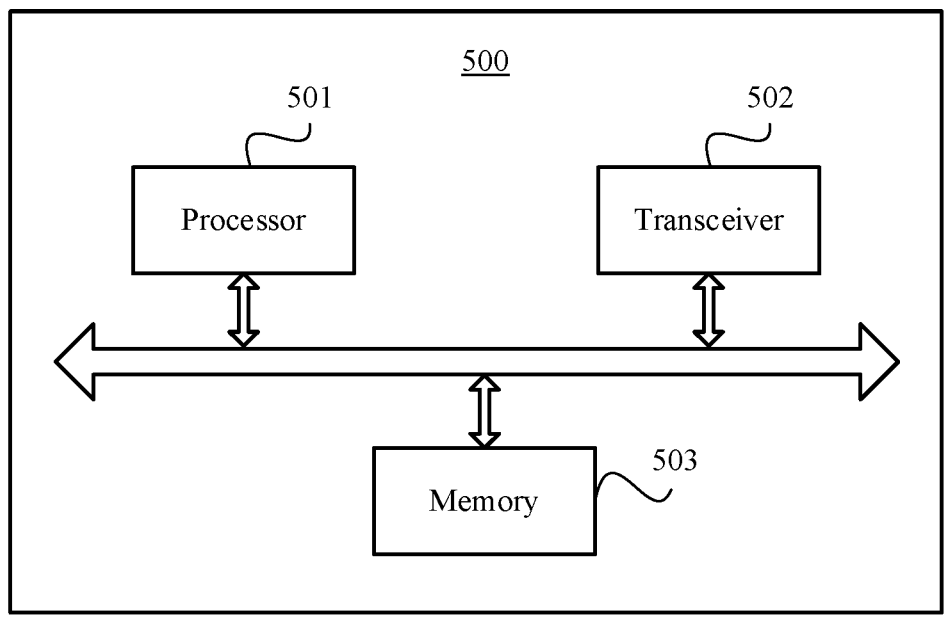
FIG. 5 is a schematic structural diagram of a communications apparatus according to an embodiment of this application.

It should be understood that division into the foregoing units is merely logical function division. In an actual implementation, all or some of the units may be integrated into a physical entity, or may be physically separate. In this embodiment of this application, the processing unit 401 may be implemented by a processor, and the transceiver unit 402 may be implemented by a transceiver. Specifically, FIG. 5 is a schematic structural diagram of a communications apparatus according to an embodiment of this application. The communications apparatus 500 shown in FIG. 5 may include a processor 501, a transceiver 502, and a memory 503. The memory 503 may be configured to store a computer-readable instruction. The processor 501 is configured to execute the computer-readable instruction stored in the memory, and control the transceiver 502 to receive and send a signal. When reading and executing the computer-readable instruction, the processor 501 may further perform actions or methods performed by the terminal in step 101 and step 102. Details are not described herein.

Based on a same technical concept, an embodiment of this application further provides a communications apparatus. The communications apparatus may perform actions performed by the network device in the foregoing method embodiment.

Figure 6:
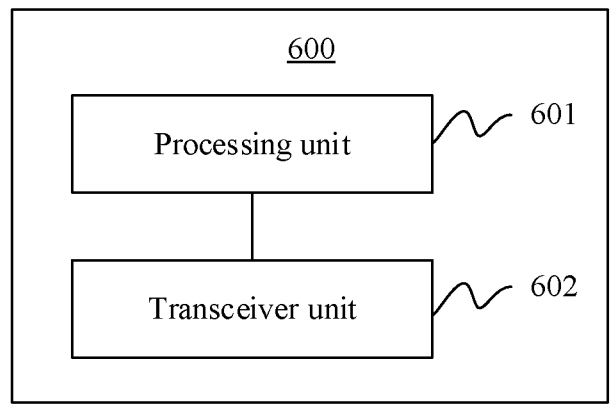
FIG. 6 is a schematic structural diagram of a communications apparatus according to an embodiment of this application.

FIG. 6 is a schematic structural diagram of a communications apparatus according to an embodiment of this application.

The communications apparatus 600 includes a processing unit 601 and a transceiver unit 602.

The transceiver unit 602 is configured to obtain a quality of service class identifier QCI of a low-latency service corresponding to an application program that is running on a terminal.

The processing unit 601 is configured to: if average duration of K consecutive listen before talks LBTs in an unlicensed frequency band is greater than a latency corresponding to the QCI of the low-latency service, schedule a data packet of the low-latency service to a licensed frequency band for transmission, where K is an integer greater than 0.

The communications apparatus 600 may further perform another action or method performed by the terminal in the foregoing method embodiment. For details, refer to the descriptions in step 301 and step 302. Details are not described herein.

Figure 7:
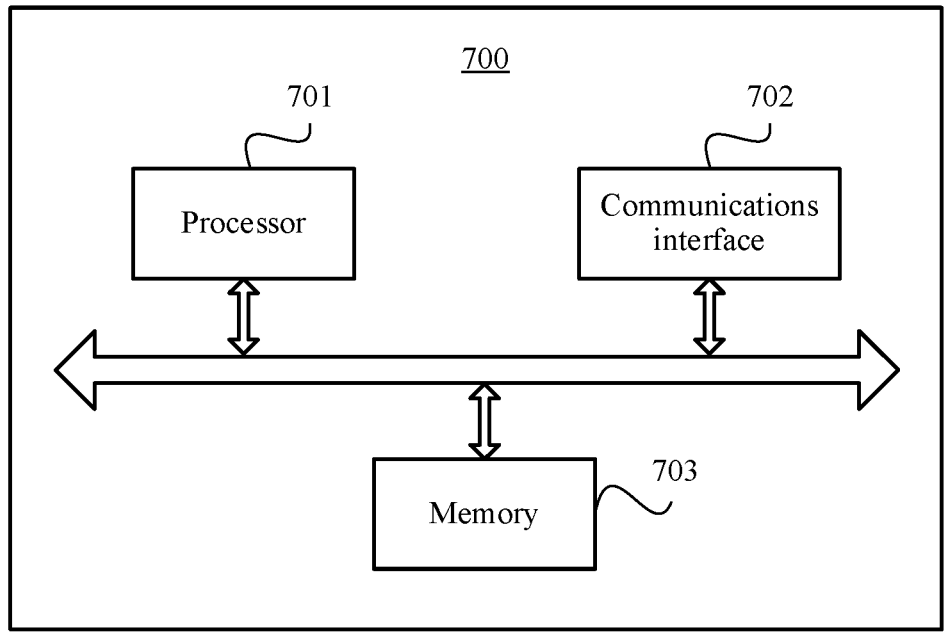
FIG. 7 is a schematic structural diagram of a communications apparatus according to an embodiment of this application.

It should be understood that division into the foregoing units is merely logical function division. In an actual implementation, all or some of the units may be integrated into a physical entity, or may be physically separate. In this embodiment of this application, the processing unit 601 may be implemented by a processor, and the transceiver unit 602 may be implemented by a communications interface. Specifically, FIG. 7 is a schematic structural diagram of a communications apparatus according to an embodiment of this application. The communications apparatus 700 shown in FIG. 7 may include a processor 701, a communications interface 702, and a memory 703. The memory 703 may be configured to store a computer-readable instruction. The processor 701 is configured to execute the computer-readable instruction stored in the memory, and control the communications interface 702 to receive and send a signal. When reading and executing the computer-readable instruction, the processor 701 may further perform actions or methods performed by the network device in step 301 and step 302. Details are not described herein.

The communications interface 702 may be a wired communications interface, a wireless communications interface, or a combination thereof. The wired communications interface may be, for example, an Ethernet interface. The Ethernet interface may be an optical interface, an electrical interface, or a combination thereof. The wireless communications interface may be a wireless local area network interface or the like.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a magnetic disk memory, an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

Obviously, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A data packet transmission method, comprising:
obtaining N application programs running on a terminal, wherein N is an integer greater than 0;
determining whether an unlicensed frequency band is in a congestion state or not when the N application programs comprise an application program comprising a low-latency service; and
instructing a network device to schedule a data packet of the terminal to a licensed frequency band for transmission in response to the unlicensed frequency band being in a congestion state;
wherein the determining whether the N application programs comprise the application program comprising the low-latency service comprises:
collecting, in a preset period statistics about a quantity of uplink data packets of each of the N application programs, and when a quantity of uplink data packets of at least one of the N application programs is greater than a first threshold, determining that the application program comprising a low-latency service is running on the terminal.

2. The method according to claim 1, wherein the determining that the N application programs comprise the application program comprising the low-latency service comprises:
collecting, in a preset period, statistics about a quantity of downlink data packets of each of the N application programs, and determining that the application program comprising a low-latency service is running on the terminal when a quantity of downlink data packets of at least one of the N application programs is greater than a second threshold.

3. The method according to claim 1, wherein the determining that the N application programs comprise the application program comprising the low-latency service comprises:
collecting, in a preset period, statistics about a quantity of sockets used by each of the N application programs, and when a quantity of sockets used by at least one of the N application programs is greater than a third threshold, determining that the application program comprising a low-latency service is running on the terminal.

4. The method according to claim 1, wherein the determining that the N application programs comprise the application program comprising the low-latency service comprises:
collecting, in a preset period, statistics about a data transmission rate of a data packet of each of the N application programs, and when a data transmission rate of a data packet of at least one of the N application programs is greater than a fourth threshold, determining that the application program comprising a low-latency service is running on the terminal.

5. The method according to claim 1, wherein the determining, that the N application programs comprise an application program comprising a low-latency service comprises:
determining that the application program comprising the low-latency service is running on the terminal when the terminal determines that the N application programs comprise an application program that is the same as an application program in an application program list, wherein each application program in the application program list is an application program corresponding to a low-latency service;
wherein the N application programs are greater in number than the application program.

6. The method according to claim 1, wherein the instructing the network device to schedule the data packet of the terminal to the licensed frequency band for transmission comprises:
instructing, by sending capability information of the terminal to the network device, the network device to schedule the data packet of the terminal to the licensed frequency band for transmission, wherein the capability information indicates that the terminal does not have a capability of supporting licensed assisted access (LAA).

7. The method according to claim 1, wherein the instructing the network device to schedule the data packet of the terminal to the licensed frequency band for transmission comprises:
when a channel quality indicator CQI in the unlicensed frequency band is less than or equal to a preset CQI, instructing, by sending the CQI in the unlicensed frequency band to the network device, the network device to schedule the data packet of the terminal to the licensed frequency band for transmission.

8. The method according to claim 1, wherein the instructing the network device to schedule the data packet of the terminal to the licensed frequency band for transmission comprises:
instructing, by sending an A2 event measurement report corresponding to the unlicensed frequency band to the network device, the network device to schedule the data packet of the terminal to the licensed frequency band for transmission, wherein the A2 event measurement report is used to indicate that signal quality of the unlicensed frequency band that has been configured for the terminal is less than a first quality threshold.

9. The method according to claim 1, wherein the determining whether the unlicensed frequency band is in the congestion state further comprises:
determining, based on a quantity of discovery reference signals DRSs received in the unlicensed frequency band in a preset time period, that the unlicensed frequency band is in the congestion state.

10. The method according to claim 1, wherein the determining that the N application programs comprise the application program comprising the low-latency service comprises:
obtaining a transmission latency of a ping data packet in the unlicensed frequency band by sending a packet internet groper (ping) data packet in the unlicensed frequency band, determining that the transmission latency is greater than a threshold, determining that the unlicensed frequency band is in the congestion state if determining that the transmission latency is greater than a threshold, and determining that the unlicensed frequency band is in an idle state if determining that the transmission latency is less than the threshold.

11. The method according to claim 1, further comprising:
wherein in response to determining that the N application programs comprise the application program comprising the low-latency service, discarding a generated A4 event measurement report or not generating the A4 event measurement report, so that the network device cannot determine the signal quality of the unlicensed frequency band based on the A4 event measurement report, and scheduling the data packet of the terminal to the licensed frequency band for transmission.

12. A communications apparatus, comprising:
a processor, configured to:
obtain N application programs that are running on the terminal, wherein N is an integer greater than 0; and
determine whether an unlicensed frequency band is in a congestion state; and
a transceiver, configured to: instruct a network device to schedule a data packet of the terminal to a licensed frequency band for transmission in response to the N application programs comprising an application program comprising a low-latency service and the unlicensed frequency band being in a congestion state;
wherein the processor is configured to:
collect, in a preset period, statistics about a quantity of uplink data packets of each of the N application programs, and determine that the application program comprising the low-latency service is running when a quantity of uplink data packets of at east one of the N application programs is greater than a first threshold.

13. The apparatus according to claim 12, wherein the processor is configured to:
collect, in a preset period, statistics about a quantity of downlink data packets of each of the N application programs, and determine that the application program comprising the low-latency service is running when a quantity of downlink data packets of at least one of the N application programs is greater than a second threshold.

14. The apparatus according to claim 12, wherein the processor is configured to:
collect, in a preset period, statistics about a quantity of sockets used by each of the N application programs, and determine that the application program comprising the low-latency service is running when a quantity of sockets used by at least one of the N application programs is greater than a third threshold.

15. The apparatus according to claim 12, wherein the processor is configured to:
collect, in a preset period, statistics about a data transmission rate of a data packet of each of the N application programs, and determine that the application program comprising a low-latency service is running when a data transmission rate of a data packet of at least one of the N application programs is greater than a fourth threshold.

16. The apparatus according to claim 12, wherein the processor is configured to:
   determine that the application program comprising the low-latency service is running on the terminal when the terminal determines that the N application programs comprise an application program that is the same as an application program in an application program list, wherein each application program in the application program list is an application program corresponding to a low-latency service;
   wherein the N application programs are greater in number than the application program.

17. The apparatus according to claim 12, wherein the transceiver is configured to:
   instruct, by sending capability information of the terminal to the network device, the network device to schedule the data packet of the terminal to the licensed frequency band for transmission, wherein the capability information indicates that the terminal does not have a capability of supporting licensed assisted access (LAA).

18. The apparatus according to claim 12, wherein the transceiver is configured to:
   when a channel quality indicator CQI in the unlicensed frequency band is less than or equal to a preset CQI, instruct, by sending the CQI in the unlicensed frequency band to the network device, the network device to schedule the data packet of the terminal to the licensed frequency band for transmission.

19. The apparatus according to claim 12, wherein the transceiver is configured to:
   instruct, by sending an A2 event measurement report corresponding to the unlicensed frequency band to the network device, the network device to schedule the data packet of the terminal to the licensed frequency band for transmission, wherein the A2 event measurement report is used to indicate that signal quality of the unlicensed frequency band that has been configured for the terminal is less than a first quality threshold.

20. The apparatus according to claim 12, wherein the processor is configured to:
   determine, based on a quantity of discovery reference signals DRSs received in the unlicensed frequency band in a preset time period, whether the unlicensed frequency band is in a congestion state.

21. The apparatus according to claim 12, wherein the processor is configured to:
   obtain a transmission latency of a ping data packet in the unlicensed frequency band by sending a packet internet groper (ping) data packet in the unlicensed frequency band, determine that the transmission latency is greater than a threshold, determine that the unlicensed frequency band is in the congestion state if determining that the transmission latency is greater than a threshold, and determine that the unlicensed frequency band is in an idle state if determining that the transmission latency is less than the threshold.

22. The apparatus according to claim 12, wherein the processor is configured to:
   wherein in response to determining that the N application programs comprise the application program comprising the low-latency service, discard a generated A4 event measurement report or not generate the A4 event measurement report, so that the network device cannot determine the signal quality of the unlicensed frequency band based on the A4 event measurement report, and scheduling the data packet of the terminal to the licensed frequency band for transmission.

\* \* \* \* \*